(12) United States Patent
Spagnolo

(10) Patent No.: US 8,655,708 B2
(45) Date of Patent: Feb. 18, 2014

(54) SYSTEMS AND METHODS FOR GENERATING AND USING TRADE AREAS ASSOCIATED WITH BUSINESS BRANCHES BASED ON CORRELATED DEMOGRAPHICS

(75) Inventor: Anthony J. Spagnolo, Toronto (CA)

(73) Assignee: The Toronto Dominion Bank, Toronto (CA)

( * ) Notice: Subject to any disclaimer, the term of this patent is extended or adjusted under 35 U.S.C. 154(b) by 890 days.

(21) Appl. No.: 12/339,712

(22) Filed: Dec. 19, 2008

(65) Prior Publication Data

US 2010/0161376 A1     Jun. 24, 2010

(51) Int. Cl.
| G06Q 10/00 | (2012.01) |
| G06Q 30/00 | (2012.01) |
| G06F 9/44  | (2006.01) |
| G06N 7/02  | (2006.01) |
| G06N 7/06  | (2006.01) |

(52) U.S. Cl.
USPC ....... 705/7.34; 705/7.33; 705/7.29; 705/7.31; 705/7.36; 705/7.37; 706/52

(58) Field of Classification Search
CPC . G06Q 10/063; G06Q 30/02; G06Q 30/0201; G06Q 30/0202; G06Q 30/0204; G06Q 30/0269
USPC ........... 705/7.29, 7.31, 7.33, 7.34, 7.36, 7.37; 706/52
See application file for complete search history.

(56) References Cited

U.S. PATENT DOCUMENTS

| 6,604,083 | B1 * | 8/2003 | Bailey ........................... 705/7.34 |
| 7,516,085 | B2 * | 4/2009 | Bailey ........................... 705/7.34 |
| 7,526,439 | B2 * | 4/2009 | Freishtat et al. ........... 705/26.41 |
| 2003/0065595 | A1 * | 4/2003 | Anglum ........................... 705/35 |
| 2005/0246222 | A1 * | 11/2005 | Bailey ............................. 705/10 |
| 2007/0112618 | A1 * | 5/2007 | Krneta ............................. 705/10 |
| 2008/0136583 | A1 * | 6/2008 | Kruger et al. ................... 340/5.1 |
| 2010/0041419 | A1 * | 2/2010 | Svendsen et al. .......... 455/456.3 |

OTHER PUBLICATIONS

Alpert et al, Fitting branch locations, performance standards and marketing strategies, Journal of Marketing 38, 000002, ABI Inform Global, Apr. 1974.*
Clawson Joseph C, Fitting branch locations, performance standards and marketing strategies to local conditions, Journal of Marketing 38, 000001, ABI Inform Global, p. 8, Jan. 1974.*
Crossland, Spatial decision support systems—an overview of technology and a test of efficacy, Decision Support Systems No. 14, pp. 219-235, 1995.*
Deichert et al, Locating financial branch facilities, A guide to techniques and literature, Nebraska Economic and Business Reports, No. 34, Sep. 1983.*
Desham Paul J, Designing and Implementing Strategies for solving large location-allocation problems with heuristic methods, NCGIA, Report 9-10, Jun. 1991.*

(Continued)

*Primary Examiner* — Lynda Jasmin
*Assistant Examiner* — Octavian Rotaru

(57) ABSTRACT

Methods and systems are provided for determining and using market areas associated with one or more branches of a business. Market areas are determined using a combination of deterministic and probabilistic techniques. Distances are calculated between customers and associated branches and a convex hull formed containing the closest 60%. A block and a tightened block is formed of dissemination areas contained within the convex hull. Where blocks are shared between branches, dissemination areas are weighted according to the portion of customers associated with each branch.

18 Claims, 7 Drawing Sheets

(56) References Cited

OTHER PUBLICATIONS

Haastrup et al, A decision support system for urban waste management, European Jornal of Operations Research, 109, p. 330-341, 1998.*

Hopmans, Anton CM, A spatial interaction model for branch bank accounts, European Journal of Operations Research 27, p. 242-250, North-Holland, 1986.*

Li et al, Design of spatial decision support systems for property professionals using MapObjects and Excel, Automation in construction 12, pp. 565-573, Elsevier, 2004.*

Mapping Analytics, the Intelligent Approch to Bank branch site decisions in a challenging economy 2008.*

Mendes et al, Multi-outlet retail site location assessment, International Transactions in Operational Research, 11, pp. 1-18, 2004.*

Midwest Transportation Center, A computer aided decision support system for making locational decisions, preapared by the University of Iowa, Public Policy Center, Jul. 1990.*

Mirchandani et al, Four models for decision support system, Information and Management, 35, p. 31-43, Elsevier, 1991.*

PCensus User Guide 8-5, Tetrad Computer Applications 2006.*

Scheibe et al, Going the last mile—A spatial decision support system for wireless broadband communications, Decision Support Systems, 42, pp. 557-570, Elsevier, 2005.*

Vance Heather, Opportunity Index Development for Bank Branch Networks, Thesis, Graduate Department of Mechanical and Industrial Engineering, University of Totonto, 2000 http://www.collectionscanada.gc.ca/obj/s4/f2/dsk1/tape4/PQDD_0019/MQ54116.pdf.*

Willer David J, A spatial decision support system for bank location—a case study, National Center for Geographic Information and Analysis, Technical Report 909-9, Nov. 1990.*

Yeh et al, An Integrated GIS and Location—Allocation approch to public facilities planniong, Comput Environ and Urban Systems, V20, No. 4, pp. 339-350, Elsevier Science 1996.*

Anselin Luc, GeoDa 0.9 User Guide, Center for Spatially Integrated Social Science, 2003 http://www.unc.edu/~emch/gisph/geoda093.pdf.*

David L Huff, The Use of Geographic Systems and Spatial Models in Market Area Analysis, ESRI GEO Info Summit, Chicago, Apr. 2005 http://proceedings.esri.com/library/userconf/geoinfo05/docs/huff.pdf.*

Duggal Niti, Retail Location Analysis, Kent State University, Thesis, Dec. 2007 http://etd.ohiolink.edu/send-pdf.cgi/Niti%20Duggal.pdf?kent1196133312.*

UV Extension, LakeMills Trade Area Analysis, uwex edu webpages, Nov. 11, 2007 http://www.uwex.edu/ces/cced/economies/mainstreet/documents/LakeMills_Trade_Area_Analysis.pdf.*

UV Extension, Stevens Point Trade Area, uwex edu webpages, Apr. 11, 2007 http://www.uwex.edu/CES/cced/economies/mainstreet/documents/Stevens_Point_Trade_Area.pdf.*

Yrigoyen et al, Spatial Interaction Models Applied to the Design of Retail Trade Areas, archives org, Mar. 8, 2005 http://www.uam.es/personal_pdi/economicas/coro/investigacion/viena98.PDF.*

Boots et al, Modeling Retail Trade Areas Using Higher-Order Multiplicatively Weighted Voronoi Diagrams, Journal of Retailing, ISSN 00224359, v73-4, pp. 519-536, 1997 http://www.sciencedirect.com/science/article/pii/S0022435997900336.*

Longley et al, GIS for Business and Service Planning, Pearson Professional, GeoInformation International, ISBN 0-470-23510-1, 1995.*

* cited by examiner

SYSTEMS AND METHODS FOR GENERATING AND USING TRADE AREAS ASSOCIATED WITH BUSINESS BRANCHES BASED ON CORRELATED DEMOGRAPHICS

FIELD OF THE INVENTION

This invention relates to generating reports on trade areas. In particular it relates to analyzing customers and potential customers surrounding a location to determine market profile and opportunity.

BACKGROUND OF THE INVENTION

For businesses based on physical retail operation, success of the business depends in part on the customers who live or work in the vicinity and frequent the operation.

Retail or service operations generally refers to businesses, business branches, franchises or, service providers, that are based around a physical location, such as a store, branch, outlet, office or other entity as defined by the business or operator. Customers visit the location to purchase goods and/or receive services from the business.

Since the business generally depends on people visiting the physical location, the business is often interested in information about the people who live or work in the area around the location. This information may reveal competition, market penetration, and growth potential. The information may also be used to generate metrics for comparing a first location with a second location for measuring productivity. Targeted marketing and customer profiling may also be done with this information.

A 'market area', 'trade area' or 'service area' is the area around a physical location that is of interest when analysing the customers and potential customers for the business. A 'market area' may be identified in different ways using one of two approaches, a deterministic approach characterized by a hard line boundary around a location and a probabilistic approach with a probabilistic boundary around a location.

In a deterministic approach, each person who lies within the trade area of a certain location, is considered a consumer of interest to the business, and if not, then those persons are not being targeted. This is a very appealing approach due to its conceptual simplicity and ease of use. Examples of deterministic methods include: user drawn market areas, circle market areas, percentage of customers market areas and Thiessen polygon market areas.

User drawn market areas are the most basic deterministic method for defining a retail environment. The method consists of a knowledgeable person within the company hand drawing what is suspected to be the market area for the location. This approach relies heavily on the experience and expertise of the person defining the area. The major flaw of this approach is that it is highly unconstructed and therefore subjective. The potential for inconsistency and error increases in relation to the number of locations within the business and the variety of their types and market settings.

Circle market areas are created by defining a radius and drawing a circle around the location in which it is suspected that your market area lies. This is believed to be the most popular method for defining market areas due to its simplicity and relatively inexpensive cost.

Generally a Geographic Information System (GIS) software package comes equipped to perform this method of market definition. Defining the radius of the circle can be done in several different manners including ad hoc/rule of thumb or by calculating the distance to the closest desired percent of customers. Generally circle trade areas are good representations of patronage when the retail offers of the given locations are undifferentiated (e.g., convenience oriented), the locations are equally accessible from all directions (e.g., the transport surface is uniform) and competition is not a major factor (is weak or ubiquitous). These conditions are not often met and as a result the circle market areas are not a particularly good reflection of the actual retail environment for most retail businesses.

Thiessen polygons are areas drawn on a map around a set of locations in which every point in the defined polygons is closer (in Euclidean distance terms) to the given location than any other location. This method creates market areas which completely fill the map and do not allow any overlap between regions. When using such a method it is common to use all locations competing in the same market (not just 'own' locations). The Thiessen approach provides reasonable market area definition under the following conditions: 1. People patronize the closest location (exclusively), 2. All locations are of equal size and overall attractiveness, or, alternatively, the size and attractiveness do not make a difference to customers, 3. The distribution of 'competing' locations covers the whole area being analyzed and the locations are effectively a 'spatial monopolist', 4. Travel is of equal ease in all directions, 5. There are no barriers to travel. These conditions are rarely met within the retail and service environment.

Percentage of customers is a direct approach to defining market areas. Using customer spotting it is possible to draw polygons enclosing any given number or percent of customers away from the store and in turn define a market area. Customer spotting, or in geographic terms geocoding, can be done several ways and flaws in geocoding will be directly translated into the trade area definition. The user must be aware of this to ensure the best method for customer spotting is performed and the present errors are fixed.

A probabilistic approach or 'fuzzy trade areas', calculates probabilities or weights that suggest how likely a consumer is to interact with a given location. There is no clear market boundary for each location and it is up to the user to define at what probability the primary and secondary markets would occur. Furthermore, one consumer can be assigned a probability of interaction with several different locations belonging to the same business. There is no clear edge to a location's market area but rather the probability of interaction decreases, typically with distance. Examples of probabilistic methods include: probabilistic demographics, approximative empirical approaches and statistically modeled approaches.

Probabilistic demographics use weights based on market penetration to define location membership. This approach gives more weight to demographic areas that have larger customer counts. Weights can be calculated several ways including location customers divided by total customers or total customers divided by total population for any given area. Once the weights for each demographic area are calculated, they are multiplied by the variables of interest to produce a more accurate look to the location customer membership.

An approximative empirical approach looks at the distance between customers and location. Such an approach would be used in the instance when customer data is present.

The customers would be plotted and distances would be calculated from the location to the closest 60 and 80 percent or portion of customers. A convex hull could also be created to enclose these primary and secondary market areas. This approach is solely based on proportions of customers. Therefore it is not possible to find areas of higher or lower interaction. However, this approach can be taken a step further and provide information on penetration rates using household or population counts. Taking this extra step allows for picking areas of high or low interaction.

The most frequently utilized statistical approach is the Huff model. The Huff model is a spatial market interaction model (MIM). Such models provide a very useful way to evaluate potential retail sites and forecast potential sales as well as assess the impact of new commercial innovations as they can virtually model entire spatial supply and demand systems. MIMs integrate origin zones, which are places of demand (census tracts or enumeration/dissemination areas) and destinations, which are places of supply (locations, such as stores or branches) through measures of attractiveness, distance, and probability. The measures of attractiveness and distance are subject to a weighting which is manually entered by the user. This weighting process involves subjectivity because the user can continually run the model using different weights until a desired outcome is reached.

As a result, there exists a need for a system and method of analyzing customer information and defining market areas to determine and use market areas for retail operations. Additionally, such a system should also objectively address the issue of customer overlap to multiple retail locations.

BRIEF DESCRIPTION OF THE DRAWINGS

In drawings which illustrate by way of example only a preferred embodiment of the invention.

DETAILED DESCRIPTION OF THE INVENTION

The preferred embodiment includes methods and systems for developing market areas. The market areas are determined using a combination of deterministic and probabilistic methodologies. Using the approach to be described, an area can be defined around each physical location. This area can be used to determine market penetration, targeted marketing and location usage.

In the preferred embodiment, a business has a plurality of locations with local representatives, or branches, each with different geographic locations. The branches may all provide substantially similar services or may provide different levels of service to customers. Often competitors are similarly situated with branches at different geographic locations. In the preferred embodiment, the business is a bank and the branches are bank branches.

Figure 1:
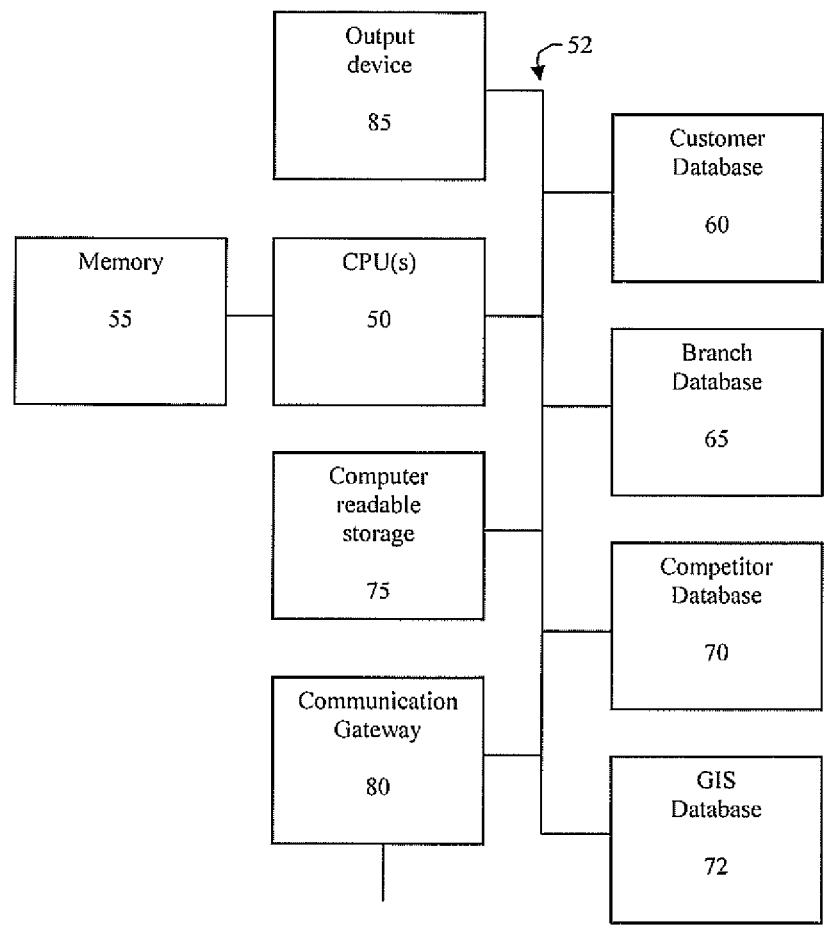
FIG. 1 is a schematic representation of a system in accordance with the exemplary embodiment.

With reference to FIG. 1, the bank preferably maintains records of the locations of its branches in a database, such as a relational database 65. This database may be maintained in the course of business operations. The bank preferably also maintains records of the locations or addresses of its customers with each customer associated with a branch. Similarly, the customer addresses may be maintained in the course of business operations in a relational database 60 maintained by the bank.

One or more processing devices 50, such as server can connect and retrieve information from the databases 60, 65, 70, 72 in communication with the server. The databases may be connected directly to the server or be in communication with the server over one or more networks, such as corporate network, wide area network (WAN) or the Internet 52. In the course of operation, the server preferably uses computer readable memory 55 for temporary storage of information and intermediate calculations. The results of its operations or large amounts of data may be stored, either long term or short term in storage 75, such as one or more hard drives, available to the server. The processor may receive instructions for execution from a computer readable medium such as a CD, DVD, magnetic or optical disc or other readable medium, including by electronic means over a network, capable of maintaining computer readable instructions or code readable by the processor.

Figure 2:
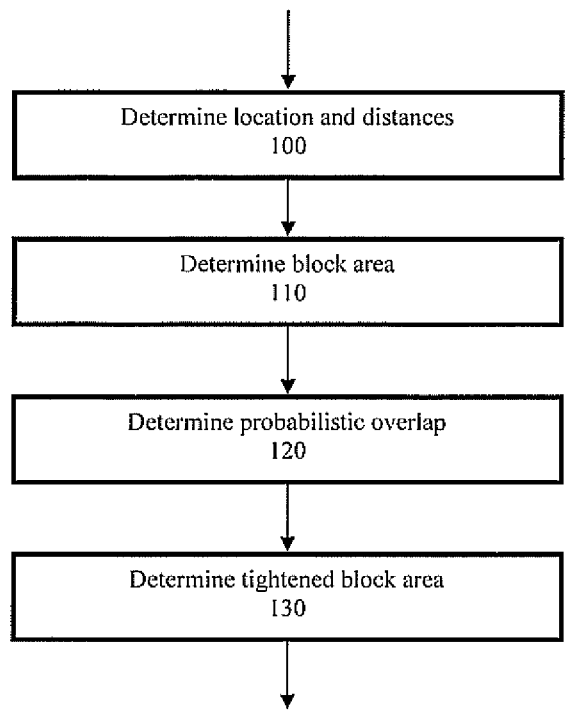
FIG. 2 is a flow chart representing the steps in accordance with the exemplary embodiment.

A general overview of the steps of the method, according to a preferred embodiment of the invention is illustrated in FIG. 2.

Figure 3:
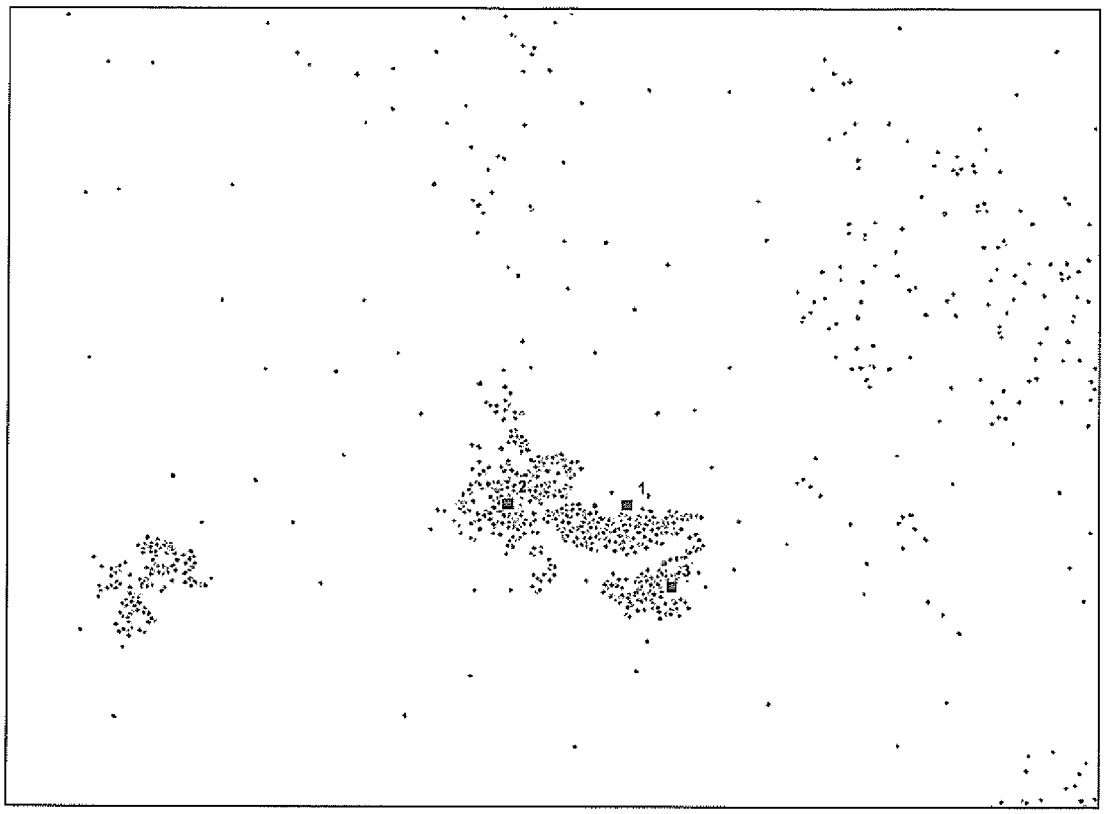
FIG. 3 is a map representing the location of three branches and the branch customers in accordance with the exemplary embodiment.

At step 100, the geographic location of branch customers are calculated and a distance is determined between a given customer and that customer's bank branch. In a preferred embodiment the customer location is determined using the address information, such as the postal code or zip code, or more preferably the street address, and the customer's branch, held in the bank's records for each customer, such as from the customer database 60. Similarly, the location of each bank branch can be obtained from the bank's records, such as from the branch database 65. A straight line distance can be calculated between the customer's location and the branch's location. As an example, FIG. 3 shows three branches 1, 2 and 3, and the relative location of the customers of branch 1.

In one embodiment, the location of each customer is determined using the postal code. The geographic location of the customer within each postal code may be estimated to be the middle of the region. Since more than one customer often have the same postal code, the various customers within the postal code may be spread out within the region. One alternative is to distribute the estimated customer locations to dissemination area (DA) boundaries relative to the dissemination area household counts. If a postal code spans more than one dissemination area, then proportions of customers with a given postal code are assigned to multiple dissemination areas relative to the household count of each dissemination area. Dissemination areas will be discussed in more detail later.

Of all the customers associated with a branch, the closest percentage or portion of the customers are determined. In a preferred embodiment, the closest 60% of customers are determined. These closest 60% form a cluster around the bank branch. A convex hull function is used to form an isopleth line around these customers. By focusing on the closest 60% of customers, outliers are more likely to be eliminated from the analysis. For example, a customer may have moved but not changed branch information with the bank. In another example, a customer may commute a long distance. In both these examples, the home address of the customer may place the customer a large distance from the branch.

Other percentage thresholds may be used, smaller such as 50% or larger such as 65%, 70% or greater than 70%. The particular percentage may be selected based on experience, the density of customers, the density of branches or other factors.

Figure 4:
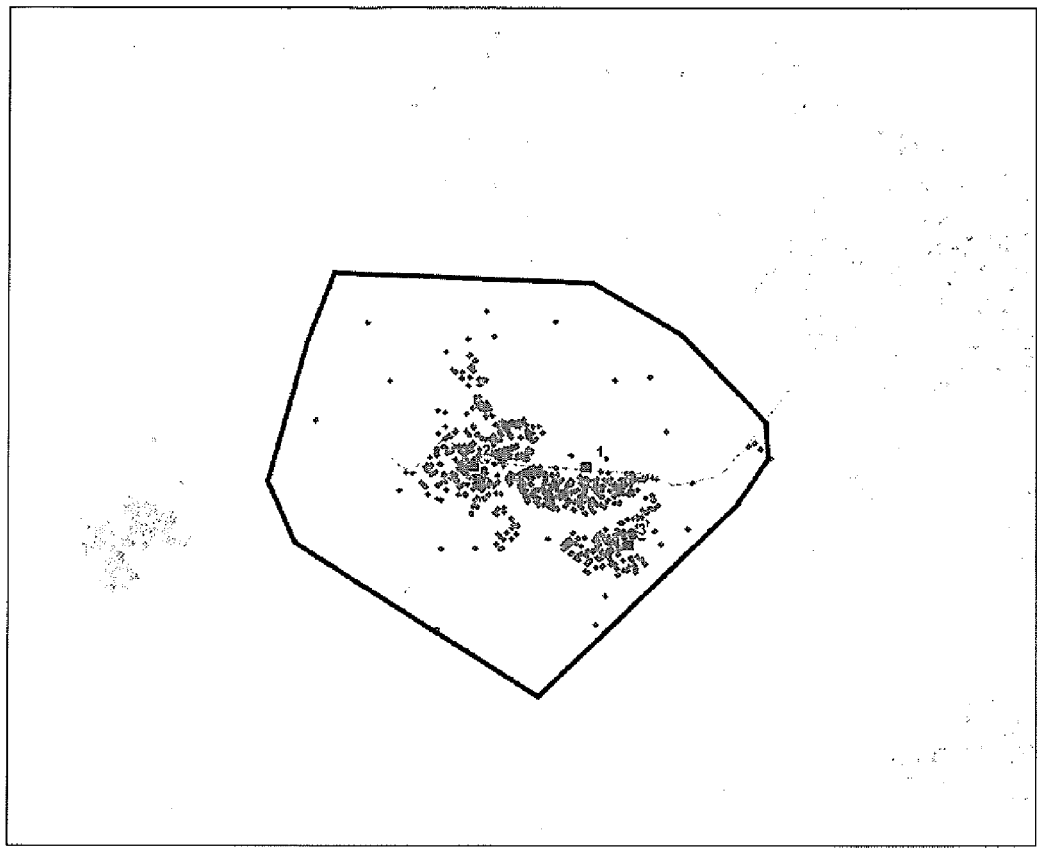
FIG. 4 is a map representing a branch and a convex hull around the closest 60% of its customers in accordance with the exemplary embodiment.

As an example, FIG. 4 shows a convex hull drawn around the closest 60% of customers around branch 1.

At step 110, a block area is determined around each branch. A block area is determined by including all the dissemination areas with weighted centers inside the isopleth line formed around a given branch. A dissemination area, or demographic area, is typically the smallest region for which statistical data is available. By using dissemination areas, regions which do not contain any customers, for examples, lakes, rivers and mountains, are generally excluded, unlike with known deterministic techniques.

In Canada, for example, Statistics Canada defines dissemination areas for the entire country with a population of about 400 to 700 people per dissemination area. By creating a block area based on dissemination areas, demographic and statistical information can more easily be obtained for the block area. Information on the location and size of the dissemination areas can be obtained, such as from the government or a statistical information provider, and used to populate a database, such as a GIS database 72. Demographic information may also be obtained and maintained in the GIS database 72 or obtained as needed from an external source, such as a database connected to the Internet. The system may use a communication gateway 80 to connect to an external source, such as a database computer or the Internet.

Figure 5:
FIG. 5 is a map representing a branch and selected dissemination areas within the convex hull in accordance with the exemplary embodiment.

A block area for a branch is termed a secondary trade area or secondary market area. As an example, FIG. 5 shows the outline of several dissemination areas for branch 1 that make up a block area in light shading.

At step 120, a probabilistic technique is used to account for potential overlap or double counting between branches. To ensure that the demographic information pulled from the market areas are not double or triple counted, the overlapping areas are weighted by the customer counts of each branch. For example if the trade areas for a first branch and a second branch share or overlap dissemination areas, the demographics and other relevant data are weighted such that if the first branch has 80 customers and the second branch has 20 customers, the dissemination area will have a value of 80% for the first branch and 20% for the second branch. As would be clear to someone skilled in the art, a dissemination area could be shared among more than two branches.

In a preferred embodiment, at optional step 130, a tightened block is determined for each branch. A count of the number of branch customers within each of the dissemination areas found at step 110 is calculated and the list of dissemination areas is ranked according to the count of customers. In a preferred embodiment, the top 60% most important dissemination areas, those with the most customers which belong to the branch, are identified as being part of the tightened block. The primary trade area or market area is then the set of dissemination areas within the tightened block.

Figure 7:
FIG. 7 is a map representing a branch and a tightened block in accordance with the exemplary embodiment.

This step effectively tightens the trade area to minimize overlap between branches and indicates the most important areas based on consumer patronage. In FIG. 7, as an example, a tightened block is shown as a dark shaded area around branch 1.

In a preferred embodiment, a unique identifier is created for each instance where a dissemination area is used. The identifier can be made from the code for the dissemination area and the branch code. In a preferred embodiment the code of the dissemination area is concatenated with the branch transit number to form the unique identifier. Since the same dissemination area can be used by multiple branches, the same dissemination area can appear multiple times in the dataset but each use be uniquely identified by its association with a particular branch.

Figure 6:
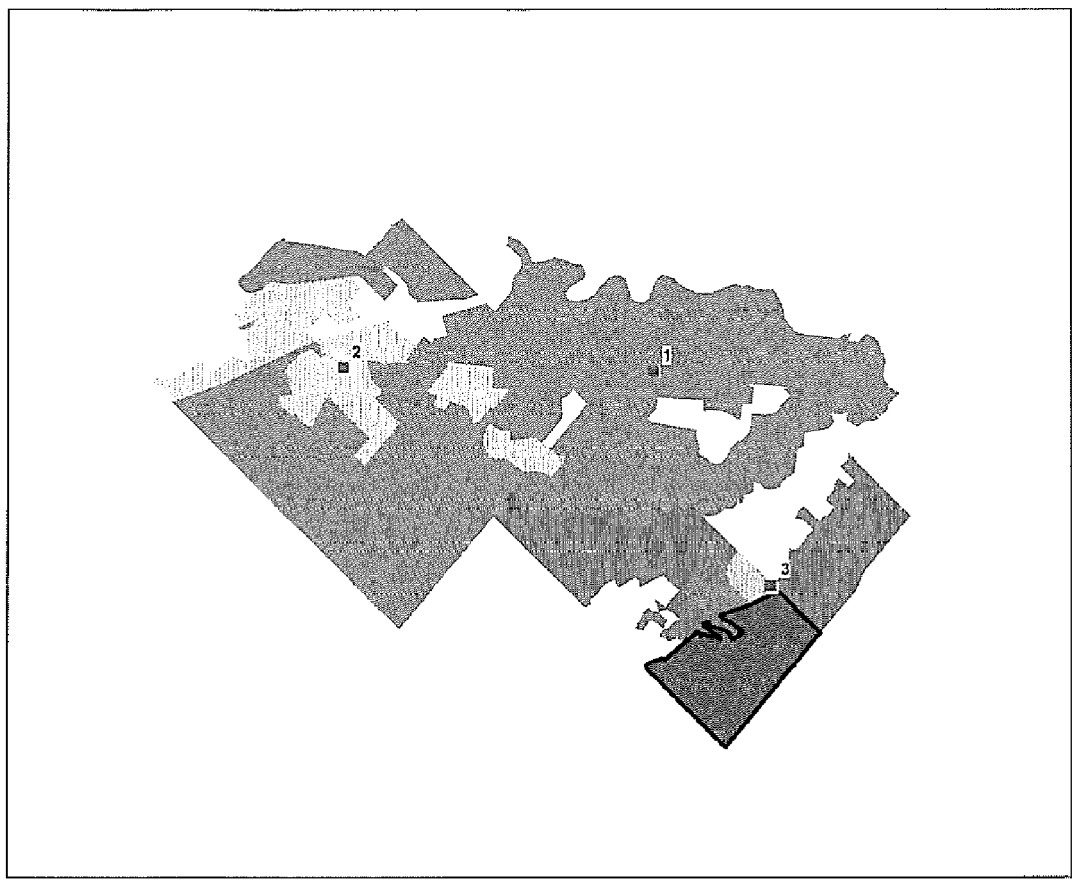
FIG. 6 is a map representing overlapping trade areas for three branches in accordance with the exemplary embodiment.

As an example, FIG. 6 shows the tightened dissemination areas for three branches, marked as 1, 2 and 3. The different degrees of shading represent whether a particular dissemination area is within the tightened area for one, two or three of the branches. The following table contains example data for the dissemination area highlighted in FIG. 6, which in this example is given the identifier 111111.

TABLE 1

| Dissemination Area | 111111 | 111111 | 111111 |
|---|---|---|---|
| Branch Reference | 1 | 2 | 3 |
| Dissemination Area area ($km^2$) | 1.14 | 1.14 | 1.14 |
| Unique Identifier | 1111111 | 1111112 | 1111113 |
| Customer Count | 193 | 180 | 207 |
| Customer Total for Dissemination Area | 580 | 580 | 580 |
| Primary Trade Area | Yes | Yes | Yes |
| Weight | 0.332759 | 0.310345 | 0.356897 |
| Distance to branch (km) | 2.90237 | 4.57747 | 0.841249 |

Continuing the example and referring to Table 1, above, there are three sets of data associated with a single dissemination area for the three branches in the region. For the purposes of distinguishing these three sets of data, unique identifiers are provided based on the identifier of the dissemination area and the branch. Each branch has customers within the dissemination area as indicated but the total customers for the dissemination is obviously common for the three instances. Since the dissemination in this example is within the primary trade area for all three branches, 'yes' is indicated for all three instances. In this example, the weight given to each instance is calculated by dividing the given branch's customer count by the total customers in the dissemination area. For example, for the first branch, the weight is $$\frac{193}{580} = 0.332759,$$

rounded to 6 digits. This weight factor can then be applied to demographic information for the dissemination area when a branch is analyzed.

The steps identified as 120 and 130 may be performed in the order described above, or in the alternative order of 130 followed by 120. In particular, the identification of the tightened block in step 130 may be completed prior to the probabilistic step 120 of addressing possible overlap between dissemination areas. In an alternative embodiment, the overlapping weights may also be affected by whether a given area is within the primary or secondary trade areas for a given branch.

Information on competitors may be obtained from public sources, such as Internet websites for the competitors or third party information sources. This information is preferable maintained in a database, such as a competitor database 70. The information preferably contains information on the location and services offered by branches of a competitor business.

The primary trade areas can be used to perform analytics for each branch. For each branch, demographic information can be determined. For example, the average income and savings of customers and potential customers can be calculated for each branch. As an example, this can be used to decide which branch should include wealth management services or should be the focus of additional advertising. The system can output the results on a display 85, such as on a website accessible using a web browser, which is preferably accessible by people within the company. Preferably, the information is kept confidential to provide a competitive advantage for the business. The system may also produce market strategy reports to be used by branches using the system, such as by printing reports. The information may be displayed graphically with the locations of dissemination areas and branches shown in a geographic representation.

The primary trade areas and the demographics of each trade area can be used to compare branches across a company. Rather than comparing branches based on the number of customers, comparisons can be made on the basis of the demographics of their customers, the amount of competition, the size of the market area and other factors. These comparisons can be used to identify peer clusters of branches in order to compare the performance of branches.

In an alternative embodiment of the invention, the branches are distribution points for food or other supplies to a population in the surrounding area. A food bank, or other operation which distributes supplies, may identify users of the food bank in the vicinity serviced by a particular distribution point. By using the invention as described above a food bank can determine the demographics of the population serviced by a particular distribution point, including when its service area overlaps with the service areas of neighbouring distribution points. For example, a food bank may be interested in the number of children being provided with food through its operation and the number of hungry children that are not being provided with sufficient food and in need of further outreach by the food bank. This would also assist the food bank in maintaining inventory levels appropriate to the expected number of consumers or "customers" in need of the service.

Various embodiments of the present invention having been thus described in detail by way of example, it will be apparent to those skilled in the art that variations and modifications may be made without departing from the invention.

I claim:

1. A computer implemented method for geographically comparing a plurality of business branches, the method comprising:
    receiving a plurality of business branches addresses and a plurality of customers addresses, wherein the customers addresses comprise at least one of a customer's street address, a customer's zip code, or a customer's postal code;
    calculating, by a processor, a plurality of straight line distances between each of the plurality of business branches addresses and each of the plurality of customers addresses, to determine a first percentage threshold of a plurality of customers closest to each of the plurality of business branches addresses,
    utilizing, by the processor, a convex hull function to form an isopleth line around said first percentage threshold of the plurality of customers closest to each of the plurality of business branches addresses,
    receiving publicly available dissemination areas,
    determining, by the processor, a secondary trade area for each of the plurality of business branches' addresses by including the publicly available dissemination areas with weighed centers inside the isopleth line,
    minimizing, by the processor, an overlap of the secondary trade area between each of the plurality of businesses branches, said minimizing comprising:
        weighting the secondary trade area for each of the plurality of business branches with a ratio corresponding to each business branch's customers counts to a total dissemination area's customers counts, in order to obtain adjusted dissemination areas,
        ranking the adjusted dissemination areas according to the each business branch's customers counts,
        filtering the ranked and adjusted dissemination areas to a second percentage threshold of the each business branch's customers counts, and
        tightening the filtered, ranked and adjusted dissemination areas into a tightened trade area for each of the plurality of business branches, and
    comparing, by the processor, each of the plurality of business branches of each of the plurality of business branches' addresses, based on financial aspects of demographic data associated with each business branch's customer counts within the tightened trade area.

2. The computer implemented method of claim 1, wherein the first percentage threshold is 60%.

3. The computer implemented method of claim 2, wherein the second percentage threshold is 60%.

4. The computer implemented method of claim 3, wherein the demographic data comprises census data.

5. The computer implemented method of claim 4, wherein the financial aspects of demographic data include at least one of an average income or a financial savings for each business branch's customers counts.

6. The computer implemented method of claim 5, wherein the secondary trade area encompasses two or more of the plurality of business branches' addresses and the processor further determining, which one of the two or more of the plurality of business branches is outperforming another or others of the two or more of the plurality of business branches.

7. A system for geographically comparing a plurality of business branches, the system comprising:
    a database for storing a plurality of business branches addresses and a plurality of customers addresses, wherein the customers addresses comprise at least one of a customer's street address, a customer's zip code, or a customer's postal code;
    a processor for:
        receiving the plurality of business branches addresses and the plurality of customer addresses from the database;
        calculating a plurality of straight line distances between each of the plurality of business branches addresses and each of the plurality of customers addresses, to determine a first percentage threshold of a plurality of customers closest to each of the plurality of business branches addresses;
        utilizing a convex hull function to form an isopleth line around said first percentage threshold of the plurality of customers closest to each of the plurality of business branches addresses;
        receiving publicly available dissemination areas from a public data base;
        determining a secondary trade area for each of the plurality of business branches' addresses by including the publicly available dissemination areas with weighed centers inside the isopleth line;

minimizing an overlap of the secondary trade area between each of the plurality of businesses branches, said minimizing comprising:
    weighting the secondary trade area for each of the plurality of business branches with a ratio corresponding to each business branch's customers counts to a total dissemination area's customers counts, in order to obtain adjusted dissemination areas,
    ranking the adjusted dissemination areas according to the each business branch's customers counts,
    filtering the ranked and adjusted dissemination areas to a second percentage threshold of the each business branch's customers counts, and
    tightening the filtered, ranked and adjusted dissemination areas into a tightened trade area for each of the plurality of business branches, and
comparing each of the plurality of business branches of each of the plurality of business branches' addresses, based on financial aspects of demographic data associated with each business branch's customer counts within the tightened trade area.

8. The system of claim 7, wherein the first percentage threshold is 60%.

9. The system of claim 8, wherein the second percentage threshold is 60%.

10. The system of claim 9, wherein the demographic data comprises census data.

11. The system of claim 10, wherein the financial aspects of demographic data include at least one of an average income or a financial savings for each business branch's customer counts.

12. The system of claim 11, wherein the secondary trade area encompasses two or more of the plurality of business branches' addresses and the processor further determines which one of the two or more of the plurality of business branches is outperforming another or others of the two or more of the plurality of business branches.

13. A non-transitory computer-readable medium upon which a plurality of instructions are stored, the instructions, when executed by a computer system having a processor and memory, causes the processor to:
    receive a plurality of business branches addresses and a plurality of customers addresses, wherein the customers addresses comprise at least one of a customer's street address, a customer's zip code, or a customer's postal code;
    calculate a plurality of straight line distances between each of the plurality of business branches addresses and each of the plurality of customers addresses, to determine a first percentage threshold of a plurality of customers closest to each of the plurality of business branches addresses;
    utilize a convex hull function to form an isopleth line around said first percentage threshold of the plurality of customers closest to each of the plurality of business branches addresses;
    receive publicly available dissemination areas;
    determine a secondary trade area for each of the plurality of business branches' addresses by including the publicly available dissemination areas with weighed centers inside the isopleth line;
    minimize an overlap of the secondary trade area between each of the plurality of businesses branches, said minimizing comprising:
        weighting the secondary trade area for each of the plurality of business branches with a ratio corresponding to each business branch's customers counts to a total dissemination area's customers counts, in order to obtain adjusted dissemination areas,
        ranking the adjusted dissemination areas according to the each business branch's customers counts,
        filtering the ranked and adjusted dissemination areas to a second percentage threshold of the each business branch's customers counts, and
        tightening the filtered, ranked and adjusted dissemination areas into a tightened trade area for each of the plurality of business branches, and
    compare each of the plurality of business branches of each of the plurality of business branches' addresses, based on financial aspects of demographic data associated with each business branch's customer counts within the tightened trade area.

14. The non-transitory computer-readable medium of claim 13, wherein the first percentage threshold is 60%.

15. The non-transitory computer readable medium of claim 14, wherein the second percentage threshold is 60%.

16. The non-transitory computer readable medium of claim 15, wherein the demographic data comprises census data.

17. The non-transitory computer readable medium of claim 16, wherein the financial aspects of demographic data include at least one of an average income or a financial savings for each business branch's customer counts.

18. The non-transitory computer readable medium of claim 17, wherein the secondary trade area encompasses two or more of the plurality of business branches' addresses and the processor further determining, which one of the two or more of the plurality of business branches is outperforming another or others of the two or more of the plurality of business branches.

* * * * *